(12) United States Patent
Pulkus

(10) Patent No.: US 9,860,065 B2
(45) Date of Patent: Jan. 2, 2018

(54) SIDE-CHANNEL-PROTECTED MASKING

(71) Applicant: GIESECKE & DEVRIENT GMBH, Munich (DE)

(72) Inventor: Jurgen Pulkus, Munich (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 359 days.

(21) Appl. No.: 14/431,012

(22) PCT Filed: Sep. 23, 2013

(86) PCT No.: PCT/EP2013/002859
§ 371 (c)(1),
(2) Date: Mar. 25, 2015

(87) PCT Pub. No.: WO2014/048556
PCT Pub. Date: Apr. 3, 2014

(65) Prior Publication Data
US 2015/0244524 A1    Aug. 27, 2015

(30) Foreign Application Priority Data

Sep. 25, 2012 (DE) ........................ 10 2012 018 924

(51) Int. Cl.
*H04L 9/30* (2006.01)
*H04L 9/00* (2006.01)
*G06F 17/30* (2006.01)

(52) U.S. Cl.
CPC ...... *H04L 9/3006* (2013.01); *G06F 17/30339* (2013.01); *H04L 9/003* (2013.01); *H04L 2209/043* (2013.01)

(58) Field of Classification Search
CPC .................................................... H04L 9/3006
See application file for complete search history.

(56) References Cited

U.S. PATENT DOCUMENTS 6,940,975 B1  9/2005  Kawamura et al.
7,500,112 B1  3/2009  Wille et al.
(Continued)

FOREIGN PATENT DOCUMENTS

DE        19822217 A1    11/1999
DE    102005012098 A1    10/2005
(Continued)

OTHER PUBLICATIONS

Genelle et al., "Thwarting Higher-Order Side Channel Analysis with Additive and Multiplicative Maskings, Extended Version," URL: http://eprint.iacr.org/2011/425.pdf, Cryptographic Hardware and Embedded Systems—CHES 2011, Lecture Notes in Computer Science 6917, 2011, pp. 240-255, Springer.
(Continued)

*Primary Examiner* — Oleg Korsak
*Assistant Examiner* — Simon Kanaan
(74) *Attorney, Agent, or Firm* — Justin Cassell; Workman Nydegger

(57) ABSTRACT

The invention provides a method, in a processor, for executing a cryptographic computation. Upon the execution of the computation there is applied a base masking through which intermediate values are incorporated into the computation as masked intermediate values. Upon the execution of the computation a secondary masking is additionally applied, wherein for each intermediate value masked by means of the base masking the one's complement of the masked intermediate value is formed, the masked intermediate value and the one's complement of the masked intermediate value are made available, and randomly the computation is executed either with the masked intermediate value or with the one's complement of the masked intermediate value.

9 Claims, 11 Drawing Sheets

(56) References Cited

U.S. PATENT DOCUMENTS

| | | | |
|---|---|---|---|
| 7,965,836 B2 | 6/2011 | Ahn et al. | |
| 8,577,025 B2 | 11/2013 | Fumaroli et al. | |
| 2005/0207571 A1 | 9/2005 | Ahn et al. | |
| 2005/0273630 A1* | 12/2005 | Shu | G06F 9/3001 713/189 |
| 2011/0085662 A1* | 4/2011 | Myers | H03K 19/17704 380/252 |
| 2011/0129084 A1 | 6/2011 | Fumaroli et al. | |
| 2015/0222421 A1* | 8/2015 | Guo | H04L 9/003 380/28 |
| 2015/0222423 A1* | 8/2015 | Pepin | G06F 7/00 713/189 |

FOREIGN PATENT DOCUMENTS

| | | |
|---|---|---|
| EP | 1115094 A2 | 7/2001 |
| EP | 1833190 B1 | 8/2010 |
| EP | 2302552 A1 | 3/2011 |
| WO | 2001031422 A2 | 5/2001 |

OTHER PUBLICATIONS

German Search Report for corresponding German Application No. 102012018924.9, dated May 13, 2013.

Hoang et al. "Intra-Masking Dual-Rail Memory on LUT Implementation for Tamper-Resistant AES on FPGA," Proceedings of the ACM/SIGDA International Symposium on Field Programmable Gate Arrays, FPGA '12, Feb. 22, 2012, pp. 1-10.

International Search Report for corresponding International PCT Application No. PCT/EP2013/002859, dated Dec. 20, 2013.

Kim et al, "A Fast and Provably Secure Higher-Order Masking of AES S-Box," Cryptographic Hardware and Embedded Systems—CHES 2011, Lecture Notes in Computer Science 6917, 2011, pp. 95-107, Springer.

Prouff et al., "Statistical Analysis of Second Order Differential Power Analysis," URL: http://eprint.iacr.org/2010/646.pdf, IEEE Transactions on Computers 58, 2009, pp. 799-811.

Rahaman et al., "Side Channel Attack Prevention for AES Smart Card," Proceedings of the 11th International Conference on Computer and Information Technology, 2008. ICCIT 2008. IEEE, Piscataway, NJ, USA, Dec. 24, 2008, pp. 376-380.

Rivain et al., "Block Ciphers Implementations Provably Secure Against Second Order Side Channel Analysis, Extended Version," Kaisa Nyberg (ed.), Fast Software Encryption—FSE 2008, Springer, Lecture Notes in Computer Science LNCS 5086, 2008, pp. 127-143.

Schramm et al., "Higher Order Masking of the AES," Pointcheval, D. (ed.), CTRSA 2006, Springer, Lecture Notes in Computer Science LNCS 3860, 2006, pp. 208-225.

* cited by examiner

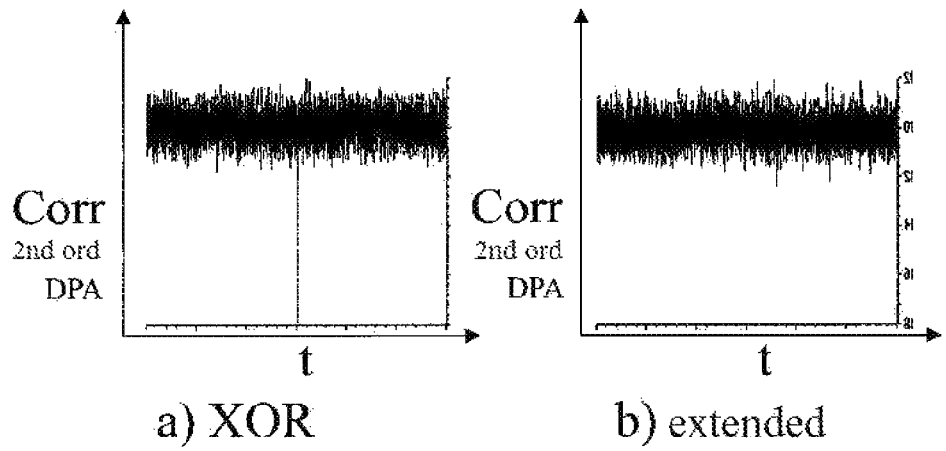
Fig. 1
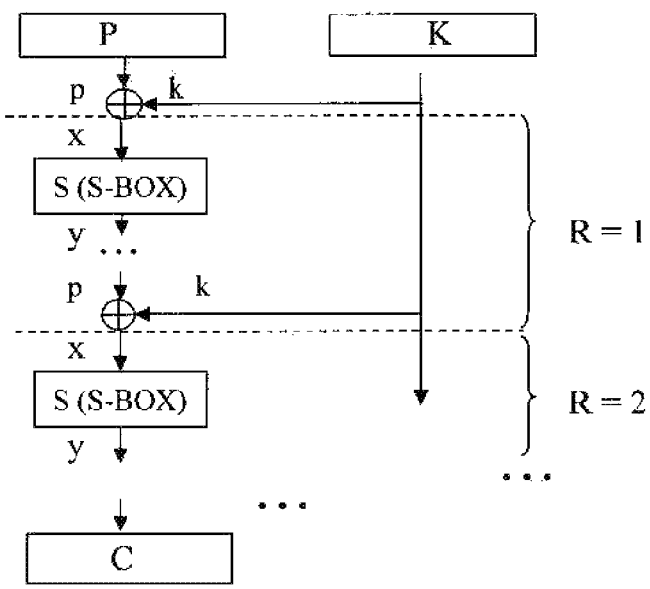
Fig. 2
a) *XOR masking:* $\quad x \to x_{XOR} = x \oplus r$
b) *Additive masking:* $\quad x \to x_{add} = x + r \bmod 2^n$
c) *Affine masking:* $\quad x \to x_\alpha = \alpha \cdot x \oplus r$
Fig. 3

Input: 12
Output: 11

|   | 0  | 1  | 2  | 3  |
|---|----|----|----|----|
| 0 | 02 | 10 | 33 | 23 |
| 1 | 30 | 03 | 11 | 21 |
| 2 | 12 | 00 | 01 | 32 |
| 3 | 20 | 13 | 31 | 22 |

Original table (quaternary system with base 4)  Fig. 4

|   | 0  | 1  | 2  | 3  |
|---|----|----|----|----|
| 0 | 22 | 31 | 13 | 20 |
| 1 | 32 | 01 | 00 | 12 |
| 2 | 21 | 11 | 03 | 30 |
| 3 | 23 | 33 | 10 | 02 |

Table with complemented input  Fig. 5

|   | 0  | 1  | 2  | 3  |
|---|----|----|----|----|
| 0 | 31 | 23 | 00 | 10 |
| 1 | 03 | 30 | 22 | 12 |
| 2 | 21 | 33 | 32 | 01 |
| 3 | 13 | 20 | 02 | 11 |

Table with complemented output  Fig. 6

|   | 0  | 1  | 2  | 3  |
|---|----|----|----|----|
| 0 | 11 | 02 | 20 | 13 |
| 1 | 01 | 32 | 33 | 21 |
| 2 | 12 | 22 | 30 | 03 |
| 3 | 10 | 00 | 23 | 31 |

Table with complemented input and output  Fig. 7

|   | 0  | 1  | 2  | 3  |
|---|----|----|----|----|
| 0 | 13 | 20 | 22 | 31 |
| 1 | 00 | 12 | 32 | 01 |
| 2 | 03 | 30 | 21 | 11 |
| 3 | 10 | 02 | 23 | 33 |

XOR-randomized table with
input mask 31 and output mask 00     Fig. 8

|   | 0  | 1  | 2  | 3  |
|---|----|----|----|----|
| 0 | 00 | 12 | 31 | 21 |
| 1 | 32 | 01 | 13 | 23 |
| 2 | 10 | 02 | 03 | 30 |
| 3 | 22 | 11 | 33 | 20 |

XOR-randomized table with
input mask 00 and output mask 02     Fig. 9

|   | 0  | 1  | 2  | 3  |
|---|----|----|----|----|
| 0 | 11 | 22 | 20 | 33 |
| 1 | 02 | 10 | 30 | 03 |
| 2 | 01 | 32 | 23 | 13 |
| 3 | 12 | 00 | 21 | 31 |

XOR-randomized table with
input mask 31 and output mask 02     Fig. 10

1x = input and output inverted

|   | 00 | 01 | 02 | 03 | 10 | 11 | 12 | 13 |
|---|----|----|----|----|----|----|----|----|
| 0 | 11 | 22 | 20 | 33 | 02 | 12 | 33 | 21 |
| 1 | 02 | 10 | 30 | 03 | 20 | 10 | 01 | 32 |
| 2 | 01 | 32 | 23 | 13 | 30 | 03 | 23 | 31 |
| 3 | 12 | 00 | 21 | 31 | 00 | 13 | 11 | 22 |

Simply extended XOR-randomized table
with input mask 31 and output mask 02

Fig. 11

1x = input inverted

|    | 00 | 01 | 02 | 03 | 10 | 11 | 12 | 13 |
|----|----|----|----|----|----|----|----|----|
| 00 | 11 | 22 | 20 | 33 | 31 | 21 | 00 | 12 |
| 01 | 02 | 10 | 30 | 03 | 13 | 23 | 32 | 01 |
| 02 | 01 | 32 | 23 | 13 | 03 | 30 | 10 | 02 |
| 03 | 12 | 00 | 21 | 31 | 33 | 20 | 22 | 11 |
| 10 | 22 | 11 | 13 | 00 | 02 | 12 | 33 | 21 |
| 11 | 31 | 23 | 03 | 30 | 20 | 10 | 01 | 32 |
| 12 | 32 | 01 | 10 | 20 | 30 | 03 | 23 | 31 |
| 13 | 21 | 33 | 12 | 02 | 00 | 13 | 11 | 22 |

1x = output inverted

Doubly extended XOR-randomized table
with input mask 31 and output mask 02

Fig. 12

|   | 0  | 1  | 2  | 3  |
|---|----|----|----|----|
| 0 | 23 | 30 | 03 | 11 |
| 1 | 21 | 12 | 00 | 01 |
| 2 | 32 | 20 | 13 | 31 |
| 3 | 22 | 02 | 10 | 33 |

Additively randomized table with input mask 31 and output mask 00    Fig. 13

|   | 0  | 1  | 2  | 3  |
|---|----|----|----|----|
| 0 | 10 | 12 | 01 | 31 |
| 1 | 32 | 11 | 13 | 23 |
| 2 | 20 | 02 | 03 | 00 |
| 3 | 22 | 21 | 33 | 30 |

Additively randomized table with input mask 00 and output mask 02    Fig. 14

|   | 0  | 1  | 2  | 3  |
|---|----|----|----|----|
| 0 | 31 | 32 | 11 | 13 |
| 1 | 23 | 20 | 02 | 03 |
| 2 | 00 | 22 | 21 | 33 |
| 3 | 30 | 10 | 12 | 01 |

Additively randomized table with input mask 31 and output mask 02    Fig. 15

1x = input and output inverted

|   | 00 | 01 | 02 | 03 | 10 | 11 | 12 | 13 |
|---|----|----|----|----|----|----|----|----|
| 0 | 31 | 32 | 11 | 13 | 32 | 21 | 23 | 03 |
| 1 | 23 | 20 | 02 | 03 | 00 | 12 | 11 | 33 |
| 2 | 00 | 22 | 21 | 33 | 30 | 31 | 13 | 10 |
| 3 | 30 | 10 | 12 | 01 | 20 | 22 | 01 | 02 |

Simply extended additively randomized table
with input mask 31 and output mask 02

1x = input inverted

|       |    | 00 | 01 | 02 | 03 | 10 | 11 | 12 | 13 |
|-------|----|----|----|----|----|----|----|----|----|
|       | 00 | 31 | 32 | 11 | 13 | 01 | 12 | 10 | 30 |
|       | 01 | 23 | 20 | 02 | 03 | 33 | 21 | 22 | 00 |
|       | 02 | 00 | 22 | 21 | 33 | 03 | 02 | 20 | 23 |
|       | 03 | 30 | 10 | 12 | 01 | 13 | 11 | 32 | 31 |
| 1x = output inverted | 10 | 02 | 01 | 22 | 20 | 32 | 21 | 23 | 03 |
|       | 11 | 10 | 13 | 31 | 30 | 00 | 12 | 11 | 33 |
|       | 12 | 33 | 11 | 12 | 00 | 30 | 31 | 13 | 10 |
|       | 13 | 03 | 23 | 21 | 32 | 20 | 22 | 01 | 02 |

Doubly extended additively randomized table
with input mask 31 and output mask 02

|   | 0  | 1  | 2  | 3  |
|---|----|----|----|----|
| 0 | 23 | 30 | 03 | 11 |
| 1 | 21 | 12 | 00 | 01 |
| 2 | 32 | 20 | 13 | 31 |
| 3 | 22 | 02 | 10 | 33 |

Mixed-randomized table with additive input mask 31 and output mask XOR 00   Fig. 18

|   | 0  | 1  | 2  | 3  |
|---|----|----|----|----|
| 0 | 00 | 12 | 31 | 21 |
| 1 | 32 | 01 | 13 | 23 |
| 2 | 10 | 02 | 03 | 30 |
| 3 | 22 | 11 | 33 | 20 |

Mixed-randomized table with additive input mask 00 and output mask XOR 02   Fig. 19

|   | 0  | 1  | 2  | 3  |
|---|----|----|----|----|
| 0 | 21 | 32 | 01 | 13 |
| 1 | 23 | 10 | 02 | 03 |
| 2 | 30 | 22 | 11 | 33 |
| 3 | 20 | 00 | 12 | 31 |

Mixed-randomized table with additive input mask 31 and output mask XOR 02   Fig. 20

1x = input and output inverted

|   | 00 | 01 | 02 | 03 | 10 | 11 | 12 | 13 |
|---|----|----|----|----|----|----|----|----|
| 0 | 21 | 32 | 01 | 13 | 02 | 21 | 33 | 13 |
| 1 | 23 | 10 | 02 | 03 | 00 | 22 | 11 | 03 |
| 2 | 30 | 22 | 11 | 33 | 30 | 31 | 23 | 10 |
| 3 | 20 | 00 | 12 | 31 | 20 | 32 | 01 | 12 |

Simply extended mixed-randomized table
with additive input mask 31
and XOR output mask 02

Fig. 21

1x = input inverted

|   | 00 | 01 | 02 | 03 | 10 | 11 | 12 | 13 |
|---|----|----|----|----|----|----|----|----|
| 00 | 21 | 32 | 01 | 13 | 31 | 12 | 00 | 20 |
| 01 | 23 | 10 | 02 | 03 | 33 | 11 | 22 | 30 |
| 02 | 30 | 22 | 11 | 33 | 03 | 02 | 10 | 23 |
| 03 | 20 | 00 | 12 | 31 | 13 | 01 | 32 | 21 |
| 10 | 12 | 01 | 32 | 20 | 02 | 21 | 33 | 13 |
| 11 | 10 | 23 | 31 | 30 | 00 | 22 | 11 | 03 |
| 12 | 03 | 11 | 22 | 00 | 30 | 31 | 23 | 10 |
| 13 | 13 | 33 | 21 | 02 | 20 | 32 | 01 | 12 |

1x = output inverted

Doubly extended mixed-randomized table
with additive input mask 31
and XOR output mask 02

Fig. 22

|   | 0  | 1  | 2  | 3  |
|---|----|----|----|----|
| 0 | 00 | 11 | 22 | 33 |
| 1 | 13 | 02 | 31 | 20 |
| 2 | 32 | 23 | 10 | 01 |
| 3 | 21 | 30 | 03 | 12 |

Multiplication table
for 11 in terms of minimal polynomial 103

Fig. 23

|   | 0  | 1  | 2  | 3  |
|---|----|----|----|----|
| 0 | 00 | 23 | 11 | 32 |
| 1 | 22 | 01 | 33 | 10 |
| 2 | 13 | 30 | 02 | 21 |
| 3 | 31 | 12 | 20 | 03 |

Inverted multiplication table
for 11 in terms of minimal polynomial 103

Fig. 24

|   | 0  | 1  | 2  | 3  |
|---|----|----|----|----|
| 0 | 22 | 03 | 33 | 30 |
| 1 | 11 | 13 | 10 | 21 |
| 2 | 23 | 32 | 12 | 00 |
| 3 | 20 | 02 | 31 | 01 |

Affinely randomized table with input mask 00
and output mask 00 and multiplicative mask 11
in terms of minimal polynomial 103

Fig. 25

|   | 0  | 1  | 2  | 3  |
|---|----|----|----|----|
| 0 | 02 | 20 | 01 | 31 |
| 1 | 32 | 23 | 00 | 12 |
| 2 | 13 | 11 | 21 | 10 |
| 3 | 03 | 22 | 30 | 33 |

Affinely randomized table with
input mask 31 and output mask 00 and
multiplicative mask 11 in terms of minimal polynomial 103   Fig. 26

|   | 0  | 1  | 2  | 3  |
|---|----|----|----|----|
| 0 | 20 | 01 | 31 | 32 |
| 1 | 13 | 11 | 12 | 23 |
| 2 | 21 | 30 | 10 | 02 |
| 3 | 22 | 00 | 33 | 03 |

Affinely randomized table with
input mask 00 and output mask 02 and
multiplicative mask 11 in terms of minimal polynomial 103   Fig. 27

|   | 0  | 1  | 2  | 3  |
|---|----|----|----|----|
| 0 | 00 | 22 | 03 | 33 |
| 1 | 30 | 21 | 02 | 10 |
| 2 | 11 | 13 | 23 | 12 |
| 3 | 01 | 20 | 32 | 31 |

Affinely randomized table with
input mask 31 and output mask 02 and
multiplicative mask 11 in terms of minimal polynomial 103   Fig. 28

|   | 00 | 01 | 02 | 03 | 10 | 11 | 12 | 13 |
|---|----|----|----|----|----|----|----|----|
| 0 | 00 | 22 | 03 | 33 | 02 | 01 | 13 | 32 |
| 1 | 30 | 21 | 02 | 10 | 21 | 10 | 20 | 22 |
| 2 | 11 | 13 | 23 | 12 | 23 | 31 | 12 | 03 |
| 3 | 01 | 20 | 32 | 31 | 00 | 30 | 11 | 33 |

1x = input and output inverted (columns 10–13)

Simply extended affinely randomized table with
input mask 31 and output mask 02 and
multiplicative mask 11 in terms of minimal polynomial 103

Fig. 29

|    | 00 | 01 | 02 | 03 | 10 | 11 | 12 | 13 |
|----|----|----|----|----|----|----|----|----|
| 00 | 00 | 22 | 03 | 33 | 31 | 32 | 20 | 01 |
| 01 | 30 | 21 | 02 | 10 | 12 | 23 | 13 | 11 |
| 02 | 11 | 13 | 23 | 12 | 10 | 02 | 21 | 30 |
| 03 | 01 | 20 | 32 | 31 | 33 | 03 | 22 | 00 |
| 10 | 33 | 11 | 30 | 00 | 02 | 01 | 13 | 32 |
| 11 | 03 | 12 | 31 | 23 | 21 | 10 | 20 | 22 |
| 12 | 22 | 20 | 10 | 21 | 23 | 31 | 12 | 03 |
| 13 | 32 | 13 | 01 | 02 | 00 | 30 | 11 | 33 |

1x = input inverted (columns 10–13)
1x = output inverted (rows 10–13)

Doubly extended affinely randomized table with
input mask 31 and output mask 02 and
multiplicative mask 11 in terms of minimal polynomial 103

Fig. 30

SIDE-CHANNEL-PROTECTED MASKING

BACKGROUND

This invention relates to a method for executing a cryptographic computation employing a cryptographic key, which is protected against spying out of the key via side-channel attacks.

Cryptographic computations are executed e.g. by general processors (CPUs), alternatively often by crypto-coprocessors, which are special processors associated with the general processors. In particular, chip cards for funds transfer applications or mobile radio applications frequently have processors (CPUs) with crypto-coprocessors. Many chip cards for funds transfer applications or mobile radio applications have crypto-coprocessors specifically designed for DES or AES (see next paragraph).

By a cryptographic computation, input data are processed to output data employing a secret key, e.g. plaintext data (input data) are encrypted to cipher data (output data) with a key or, conversely, cipher data (input data) decrypted to plaintext data (output data) with a key. Examples of symmetric (encryption key=decryption key) cryptographic computations are the algorithms DES (Data Encryption Standard) and AES (Advanced Encryption Standard).

In AES, which is subdivided into several rounds (e.g. 10, 12 or 14), the input data and the key are subdivided into blocks and processed block-wise. Within each round the data are processed byte-wise, so that, in detail, an input data byte (plaintext byte in encryption, or ciphertext byte in decryption) is respectively processed with a key byte.

Thus, e.g. in an AES encryption, which is shown schematically in extracts in FIG. 2, a plaintext P is encrypted to a ciphertext C with a key K. The plaintext P=pp . . . ppp consists of a sequence of plaintext bytes p, and the key K=kk . . . kkk of a sequence of key bytes k. At the input of each round (shown in extracts in FIG. 2 are the first two rounds R=1 and R=2) a sub-computation is executed, with the aid of which a DPA attack will be described later by way of example. In the sub-computation a plaintext byte p is XORed (p⊕k) with a key byte k, the result of the XORing inserted into a (substitution) table S (S-box), and an intermediate value x=S[p⊕k] thereby computed through a table access to the table S. The intermediate value x is fed within the round to further computation steps such as ShiftRow, MixColumn, which are not shown in FIG. 2. Key expansions and selection of key bits that are executed in AES are likewise not shown in FIG. 2. Table accesses are particularly endangered by DPA attacks.

Since the power consumption of a processor (e.g. in a chip card) depends on the processed data, cryptographic computations implemented on processors are susceptible to side-channel attacks, in which the time-resolved power consumption of the processor during the execution of the computation is measured. Usually, the power consumption is more precisely dependent on the Hamming weight of the data, i.e. on the number of ones in the data in the binary representation. The power consumption of the processor during the execution of the computation, plotted against the time elapsed during computation, is designated a power curve. Power curves of a processor for a computation are recorded for example by means of an oscilloscope.

In a DPA (differential power analysis) attack, sometimes also called a correlation power attack (CPA), a plurality of power curves (e.g. about 1000) are always recorded and synchronized for the same computation. In the computation, output data are computed with known input data and a secret key. For each possible value of the key a time-resolved correlation curve is computed between the synchronized power curves and the Hamming weight HW of the output data achieved with the respective key. The correlation curves for wrong keys consist of a more or less uniform noise, similar to the correlation curve shown in FIG. 1b. The correlation curve for the key with which the computation was executed has at a previously unknown time a statistical inconsistency in the form of a peak, similar to the correlation curve shown in FIG. 1a.

In a DPA attack of a higher (second, third, fourth, . . . ) order, power curves are recorded at several (two, three, four, . . . ) times in the time course of the computation. [PRB10] describes a second-order DPA attack.

In a DPA attack on the sub-computation of AES from FIG. 2, a plaintext byte p of the known key K is XORed (p⊕k) with a key byte k of the secret key K, the result of the XORing inserted into the 256-byte substitution table S (S-box), and the intermediate value x=S[p⊕k] thereby computed through table access. The attacker records about 1000 power curves of the sub-computation, synchronizes them and computes for each possible value 0, . . . , 255 of the key byte k the correlation curve between the synchronized measured power curves and the Hamming weight HW(x) of the intermediate value x computed with the respective key byte k. The correlation curves for wrong key bytes consist of a more or less uniform noise, similar to the correlation curve shown in FIG. 1b. The correlation curve for the right key byte with which the computation was executed has a peak at a previously unknown time, similar to the correlation curve shown in FIG. 1a. This method is executed with each key byte k of the key K until the key K is reconstructed byte by byte.

According to in-house unpublished prior art, "00/ff masking" is provided as a countermeasure against DPA attacks. Here, an intermediate result of a sub-computation is randomly computed in the computation either directly, so that the intermediate result is generated, or in a complemented manner, so that the one's complement of the intermediate result is computed. As needed, the input data (plaintext or ciphertext) and the key must in so doing be complemented, and the output data (ciphertext or plaintext) be complemented at the output of the computation. For example, the computation is thus randomly so executed that a sub-computation x=S[p⊕k] is executed, or a complementing sub-computation $\bar{x}=S'[\bar{p}\oplus\bar{k}]$ is executed, with a one's complemented S-box $S'[x]=\overline{S[x]}$ and one's complemented plaintext bytes and key bytes $\bar{p}, \bar{k}$. If about 1000 executions of the cryptographic computation are executed for an attack, computing is done statistically in respectively one half with the intermediate value x and the one's complement $\bar{x}$. The Hamming weight $HW(\bar{x})$ of the complementing sub-computation $\bar{x}=S'[\bar{p}\oplus\bar{k}]$ is subject to the formula $HW(\bar{w})=8-HW(x)$ in which the Hamming weight $HW(\bar{x})$ of the non-complemented computation occurs with a negative sign. Therefore, correlations between the power curves and the computational result achieved with the key cancel each other out on average upon randomization. There thus results for randomized computing with the intermediate value x=S[p⊕k] or the complemented intermediate value $\bar{x}=S[\overline{p\oplus k}]$, even upon computing with the right key byte, a correlation curve like that shown in FIG. 1b, as arises without countermeasures only for a wrongly guessed key bit. Execution of the computation randomly with the intermediate value x=S[p⊕k] or the complemented intermediate value $\bar{x}=S'[\bar{p}\oplus$ k̄] is thus resistant to the above-described DPA side-channel attack with correlation computation. Moreover, 00/ff masking is very memory-saving.

The computation of the one's complement of a value is executed electively by XORing the value with hexadecimal FF or 0xff, the making available of the value itself being executed in this case electively by XORing with 0 at the same place in the course of the computation where complementing with FF or 0xff is done with the one's complement. By XORing with FF a value is complemented. By XORing with zero the value remains unchanged. The execution of an XORing in both cases conceals when the value is employed and when the one's complement of the value is employed. This way of executing the randomization results in the name "00/ff masking".

In a varied DPA attack, there is computed instead of the correlation another statistic, for example the variance or a one-dimensional Kolmogorov-Smirnov statistic. Therefore, the statistical inconsistencies do not average out upon employment of the right key byte even when computing is done randomly with the intermediate value $x=S[p\oplus k]$ or the complemented intermediate value $\bar{x}=S'[\overline{p\oplus k}]$. Thus, it is nevertheless recognizable when computing is done with the right key.

A further countermeasure against DPA attacks consists in XOR masking, which is described for example in DE 198 22 217 A1, and wherein input data $E'=E\oplus r$ XORed with a random number r are processed instead of input data E.

In XOR masking it is important that all intermediate values are always masked. If masking is done carelessly this is not the case. If in AES an encryption of a masked plaintext byte $p'=p\oplus r$ is executed with a masked key byte $k'=k\oplus r$ in a sub-computation, e.g. that from FIG. 2, this yields $(p\oplus r)\oplus(k\oplus r)=p\oplus k=x$, i.e. an unmasked encryption result or intermediate result x. It is obtained for example by different masking of input data and key that all intermediate results are masked, and unmasked intermediate results never occur. For example, the input data (plaintext or ciphertext) are masked with two random numbers r, s, the key is masked with only one random number r, and a compensation masking is executed. For example, the masking is executed according to $(((p\oplus r)\oplus s)\oplus(k\oplus r))\ (r\oplus s)=p\oplus k\oplus r=x\oplus r=x_{XOR}$. The plaintext byte p is thus masked with r and s, the key byte is masked only with s, and moreover the compensation masking executed with both random numbers r, s. Therefore, an intermediate result $x_{XOR}=x\oplus r$ masked with r appears instead of the intermediate result x, cf. FIG. 3. A computation with careful XOR masking is resistant to the above-described DPA attack, regardless of the employed statistic (e.g. correlation, variance, one-dimensional Kolmogorov-Smirnov statistic). The intermediate result of the sub-computation from FIG. 2 is computed according to $S'[x]=S[x\oplus r]\oplus r$. It is evident from this that a separate substitution table (S-box) S' is required for each value of the random number r. Electively, a substitution table (S-box) S' masked with r is stored (e.g. in the chip card or the processor) for every possible value of the random number r, e.g. 256 different 256-byte tables for a 256-byte substitution table (S-box). Alternatively, the substitution table (S-box) is only computed after the specification of the random number r, preferably in a working memory RAM associated with the processor. However, this costs computing time and possibly memory space in the working memory RAM. In the course of the execution of the algorithm, e.g. of the AES, and as soon as the random number is specified, the same substitution table is always employed, in contrast. In the example from FIG. 2 the same substitution table is thus employed for all plaintext bytes p of the plaintext P and key bytes k of the key K. Therefore, in the sub-computation from FIG. 2, executed for different plaintext bytes p, p' and key bytes k, k', i.e. at different times t, t' in AES, the computed intermediate values $x_{XOR}=S[p\oplus k]\oplus r$ and $x'_{XOR}=S[p'\oplus k']\oplus r$ are masked by the same random number r, which is a weak point.

The fact that in XOR masking the same table (e.g. AES S-box) is employed in all table calls can be utilized for a higher-order DPA attack, as is described for AES e.g. in [PRB10]. In the second-order DPA attack from [PRB10] the power consumption j(t), j(e) is measured at two times t, t' and normalized to $\bar{j}(t), \bar{j}(t')$. The correlation between the product $\bar{j}(t)\cdot\bar{j}(t')$ and the Hamming weight of the value $x\oplus x'=S[p\oplus k]\oplus S[p'\oplus k']$ is computed for every possible key pair k, k' and every pair of times t, t' therefor. For the right key there results a correlation curve like that shown in FIG. 1a, with the significant peak at one time. The computation effort for the second-order attack from [PRB10] rises quadratically with the number of times and keys to be taken into consideration and is thus considerable.

A further countermeasure against DFA attacks, which is described e.g. in WO 01/31422 A2, is affine masking, which is a variation of XOR masking and aims to protect a cryptographic computation against higher-order DPA attacks. In affine masking according to WO 01/31422 A2 the masking is varied for data by masking data masked with random data before each utilization with further random data randomly selected for each utilization. As data there can be provided for example secret data (e.g. keys) or intermediate data. The sub-computation from FIG. 2 with affine masking delivers instead of an intermediate result x an intermediate result $x_\alpha=a\cdot x\oplus r$.

EP 2 302 552 A1 describes a method for executing a cryptographic algorithm, which is protected by an affine masking, with the aim of warding off higher-order (higher than 1) DPA attacks. In so doing, secret data or intermediate results x of the algorithm are masked employing an invertible binary random matrix R and a random number r according to $m(x)=R\cdot x\oplus r$.

Computations with affine masking are also subject to DPA attacks. The latter are based on the connection that if x=x' for two intermediate values x, x' of the computation, $a\cdot x\oplus r=a\cdot x'\oplus r$ as well, and vice versa. By forming a correlation or by other statistical methods over power curves that were recorded on an affinely masked computation it can be established whether or not two masked intermediate values $x_\alpha, x'_\alpha$ match. The unmasked intermediate values x, x' then accordingly match or do not.

A conceivable, comparatively secure measure against higher-order DPA attacks is to decompose each intermediate value into several parts. An example of this is second-order XOR masking, in which for each intermediate value x two random numbers r, s are specified and computations are always executed only with $x\oplus r\oplus s$, r and s, but not with the unmasked value x or simply masked values $x\oplus r, x\oplus s, r\oplus s$. Such a decomposition considerably increases the effort for implementing the computation and the computing time of the computation.

For a computation in which masked tables (e.g. XOR-masked ones) are employed—for example AES with the S-boxes as tables—there are generic measures against DPA attacks, whereby table accesses are concealed. For example, before each table call from a table the table can be newly generated in the working memory (RAM) of the computing processor, with a new (XOR) masking with a new masking parameter, e.g. with a new random number. In so doing, at each individual table call a new masking operation must be executed with which e.g. a table like that shown in FIG. 4 is converted to a table like that shown in FIG. 10. In a conventional XOR masking, as stated hereinabove, an XOR-masked table is computed at the beginning of the computation (e.g. AES), and the same table is employed for all table calls within the computation (e.g. AES). Computing a new XOR-masked table for each table call increases the computation effort to such an extent, on the other hand, that the runtime of the computation becomes unacceptable for e.g. chip cards.

Alternatively, for each table call, to establish a single table value, all table entries can be evaluated and only the right one be kept. The computing time of the computation can increase to about the hundredfold value through such generic measures, which is unacceptable e.g. for chip cards.

The article [SP06] describes maskings for tables against higher-order DPA attacks, which are suitable for AES tables and other tables. The article [RDP08] describes measures for protecting tables against higher-order side-channel attacks. For the sake of completeness, the articles [GPQ11] and [KHL11] are mentioned, which describe special methods for concealing table accesses in AES. [GPQ11] describes inversion by means of an exponentiation employing the equality $x^{-1}=x^{254}$ in $F_{256}^x$). [KHL11] describes transforming an XOR masking into a multiplicative masking before inversion and retransforming after inversion employing $(a \cdot x)=a^{-1} \cdot x^{-1}$, as well as reducing the inversion in $F_{256}$ to the subfield $F_{16}$ and the inversion of 2×2 matrices over $F_{16}$.

SUMMARY

The invention is based on the object of providing a method for executing a cryptographic computation employing a cryptographic key, which is protected against spying out of the key via side-channel attacks, in particular higher-order DPA attacks, so that the spying out of the key is prevented or at least strongly impeded, and which is at the same time efficient.

The method according to claim 1 fundamentally has the structure of a combination of a base masking—e.g. XOR masking or affine masking—and a 00/ff masking, applied to a cryptographic computation, in order to protect secret data of the computation from being spied out. The masking according to the invention is also called extended masking internally by the applicant.

The method according to claim 1 is arranged for execution in a processor (e.g. microprocessor, CPU, crypto-coprocessor, crypto-accelerator) which is arranged for executing a cryptographic computation wherein output data are generated from input data employing a cryptographic key and via the generation of intermediate values. An example of such a cryptographic computation is AES. Upon the execution of the computation there is applied a base masking through which at least some, preferably all, intermediate values are incorporated into the computation as masked intermediate values. The method is characterized in that a secondary masking is applied additionally upon the execution of the computation, wherein for each intermediate value masked by means of the base masking the one's complement of the masked intermediate value is formed, the masked intermediate value and the one's complement of the masked intermediate value are made available, and randomly the computation is executed either with the masked intermediate value or with the one's complement of the masked intermediate value.

As described above, e.g. with reference to [PRB10], a spying out of the secret key of an XOR-masked cryptographic computation is possible with a second-order DPA attack in which the power consumption j(t), j(t) is measured at two times t, t', i.e. in two different computation steps within the computation, and evaluated. In [PRB10] the considered computation steps within the computation are realized by table accesses. The weak point that is exploited in the attack is that the same table is employed at both times. According to the invention, there is applied in addition to the base masking (e.g. XOR) the secondary masking according to which computing is done randomly either with the intermediate value or the one's complement of the intermediate value. Therefore, computation steps at different times in the course of the computation, which would be similar with a mere XOR masking, are randomly made different. For a sub-computation (computation step) realized as a table access, this means that different tables are randomly employed for the different sub-computations—or equivalently different times—within the computation. A statistical evaluation of the power consumption j(t), j(t') at two (or more) times t, t' thus delivers no information about the secret key employed in the computation, as the applicant was able to confirm experimentally. In particular, even upon employment of the right key, correlation curves like those shown in FIG. 1 deliver the more or less uniform noise (cf. FIG. 1b) that arises upon employment of a wrong key, but not the prominent peak (FIG. 1a) that is to be seen e.g. with XOR masking and the right key.

In comparison to the conceivable method of computing a new XOR table with a new XOR mask for every table call in XOR masking, in the extended masking according to the invention the table must only be extended for the table access by one or more complementary tables at the beginning of the computation (hence the term extended masking). In subsequent table calls the precomputed extended table can be utilized without recomputation for each table access. For sub-computations (computation steps) other than table accesses, e.g. computations according to a computation rule (operation), in AES e.g. the shift operations "Shift Row" or "Mix Column", the behavior is analogous. At the beginning of the computation the operation (computation rule) is masked with the base masking, and at least one complementary-masked operation formed. In the sub-computations within the computation, computing is done with the previously computed masked and complementary-masked operations. Thus, extended masking is safe and at the same time efficient.

Hence, according to claim 1 there is provided a method for executing a cryptographic computation employing a cryptographic key, which is protected against spying out of the key via side-channel attacks, in particular higher-order DPA attacks, so that the spying out of the key is prevented or at least strongly impeded, and which is at the same time efficient.

As a computation there is electively provided an encryption, decryption, signature generation or signature check, electively according to a predetermined algorithm such as e.g. AES.

Electively, there is provided as a base masking a simple or multiple XOR masking, or an affine masking, or a decomposition masking, or a chaining of two or more of the above-mentioned base maskings.

Electively, the computation comprises a sub-computation by which an intermediate value is generatable from an input value while executing a table access to a table having a plurality of table entries, wherein for executing the computation or at least the sub-computation the table is masked with the base masking to a masked table, and the masked table is masked with the secondary masking, wherein the masked table is complemented, so that at least one masked complementary table is computed, the masked table and the at least one masked complementary table are made available, and the sub-computation is executed by executing the table access randomly on either the masked table or the, or a, masked complementary table.

The extended masking according to the invention is particularly advantageous for sub-computations that are formed by table calls. Particularly in the case of a table call, a recomputation of the table for each table call would mean a considerable additional computation effort. In AES the relatively elaborate non-linear S-box operation is realized as a table call. Other, comparatively simple sub-computations such as e.g. Shift Row or Mix Column are formed by directly implemented operations. For said directly implemented simple operations it can be reasonable in terms of computation effort to newly mask each sub-computation. Consequently, the invention is electively realized such that table calls are masked with the extended masking according to the invention, and directly implemented operations are masked with another, e.g. stronger but more elaborate, masking. Electively, elaborate sub-computations—such as e.g. S-box operations in AES—are masked with extended masking, and comparatively simple sub-computations—e.g. Shift Row or Mix Column—are masked by another, e.g. stronger but more elaborate, masking, e.g. new masking in each sub-computation (computation step). Alternatively, the total computation can also be extended-masked. Sub-computations between table calls should at least not be more weakly masked than table calls.

The randomized accessing of either the masked table or the, or a, masked complementary table is electively executed by extending the input value, for generating the intermediate value, by a table selection portion through which the table that is accessed is specified. The length of the table selection portion is chosen suitably for specifying the one or more complementary tables. If a single complementary table is computed, the table selection portion is preferably one bit long. If three complementary tables are computed, the table selection portion is preferably two bits long (cf. hereinafter). The bits can electively be either consecutive (e.g. aa) or be interspersed between the bits of the table input (e.g. xax; axax; etc.; cf. examples in the Figures).

The table electively has a table input and a table output, wherein exactly one masked complementary table is computed in which both the table input and the table output are complemented by the positions of the table entries in the table being complemented (complementation of the input) and the values of the table entries in the table being complemented (complementation of the output).

Electively, alternatively, the table has a table input and a table output, wherein three masked complementary tables are computed, wherein in a first masked complementary table only the table input is complemented by the positions of the table entries in the masked table being complemented, in a second masked complementary table only the table output is complemented by the values of the table entries in the masked table being complemented, and in a third masked complementary table both the table input and the table output are complemented by both the positions and the values of the table entries in the base-masked table being complemented.

Electively, the masked table and the at least one (e.g. one or alternatively three) complementary table(s) are entered into a single extended table which contains the table entries of the masked table and of the at least one complementary table in a predetermined arrangement. The arrangement of the table entries can be e.g. one after the other (cf. e.g. FIGS. 11, 12, 16, 17, 21, 22, 29, 30), or alternatively alternating like a checkerboard (starting out from the tables from FIGS. 11, 12, 16, 17, 21, 22, 29, 30 checkerboard-like scrambling of the table entries, with corresponding design of the table selection portions, where applicable).

Electively, the processor has associated therewith a permanent memory (e.g. ROM, EEPROM, ...) and a volatile working memory (e.g. RAM), wherein the table is stored in the permanent memory, and wherein the masked table and the at least one masked complementary table are computed in the volatile working memory. For example, in AES the original, unmasked S-boxes are stored in the non-volatile memory. The masked table and its complementary table(s) are computed and deposited in the volatile memory. In particular, the tables (e.g. S-boxes) are preferably loaded from the non-volatile memory into the volatile memory at the beginning of the computation (e.g. AES), the masked table and its complementary table(s) are computed in the volatile memory, and there are always employed in the further course of the computation (e.g. AES) one and the same RAM tables (masked table and its complementary table(s)) computed at the beginning of the computation (AES). For a new run of the computation (e.g. AES), e.g. a new encryption, decryption, signature computation, signature verification, there are computed new RAM tables (the masked table and its complementary table(s)).

According to an embodiment, there is stated a method wherein the masked table and at least one complementary table are employed for a plurality of table accesses to the table, electively for at least one total execution of the cryptographic computation (e.g. a run of AES), and within the plurality of table accesses it is newly randomly specified at least once, preferably for each table access, that the computation or sub-computation is executed either with the masked intermediate value or with the one's complement of the masked intermediate value, and the computation or sub-computation is executed in accordance with said specifying.

In particular, a masked table (e.g. S-box) and, starting out from the masked table, at least one (e.g. exactly one or exactly three) complementary table(s) are electively computed, e.g. in the RAM, at the beginning of the computation (e.g. AES). In the remaining course of the computation (e.g. AES) the precomputed tables and complementary table(s) are employed (e.g. from the RAM). Previously, the unmasked table is loaded from the non-volatile memory (e.g. ROM), where applicable.

Electively, the table has a table input and a table output, wherein the masked table has a masked table input, or has a masked table output, or has a masked table input and a masked table output, wherein the table input and the table output further either are masked with the same base masking or are masked with different base maskings.

The separate masking of table input and table output as stated here constitutes a chaining of the two maskings of table input and table output.

BRIEF DESCRIPTION OF THE DRAWINGS

Hereinafter the invention will be explained more closely on the basis of exemplary embodiments and with reference to the drawing, in which there are shown:

FIG. 1 correlation curves for 2nd-order DPA a) in XOR masking, b) in extended masking according to the invention;

FIG. 2 a sub-computation in AES, comprising a table access that is suitable for the extended masking according to the invention;

FIG. 3 computation rules for base-masking an intermediate value to a masked intermediate value according to XOR masking, additive masking and affine masking;

FIG. 4 a table in unmasked form (original table);

FIG. 5 a complemented table to the table from FIG. 4, with only the table input being complemented (inverted);

FIG. 6 a complemented table to the table from FIG. 4, with only the table output being complemented;

FIG. 7 a complemented table to the table from FIG. 4, with the table input and the table output being complemented;

FIG. 8 a table XOR-randomized starting out from the table from FIG. 4, with input mask 31 and output mask 00;

FIG. 9 a table XOR-randomized starting out from the table from FIG. 4, with input mask 00 and output mask 02;

FIG. 10 a table XOR-randomized starting out from the table from FIG. 4, with input mask 31 and output mask 02;

FIG. 11 a table XOR-randomized and simply extended according to the invention, starting out from the table from FIG. 10, with a single complementary table;

FIG. 12 a table XOR-randomized and doubly extended according to the invention, starting out from the table from FIG. 10, with three complementary tables;

FIG. 13 a table additively randomized starting out from the table from FIG. 4, with input mask 31 and output mask 00;

FIG. 14 a table additively randomized starting out from the table from FIG. 4, with input mask 00 and output mask 02;

FIG. 15 a table additively randomized starting out from the table from FIG. 4, with input mask 31 and output mask 02;

FIG. 18 a table mixed-randomized starting out from the table from FIG. 4, with additive input mask 31 and XOR output mask 00;

FIG. 19 a table mixed-randomized starting out from the table from FIG. 4, with additive input mask 00 and XOR output mask 02;

FIG. 20 a table mixed-randomized starting out from the table from FIG. 4, with additive input mask 31 and XOR output mask 02;

FIG. 21 a table mixed-randomized and simply extended according to the invention, starting out from the table from FIG. 20, FIG. 22 a table mixed-randomized and doubly extended according to the invention, starting out from the table from FIG. 20;

FIG. 23 a multiplication table for 11 in terms of minimal polynomial 103;

FIG. 24 a multiplication table, inverted to the table from FIG. 23, for 11 in terms of minimal polynomial 103;

FIG. 25 an affinely randomized table with input mask 00 and output mask 00 and multiplicative mask 11 in terms of minimal polynomial 103;

FIG. 26 an affinely randomized table with input mask 31 and output mask 00 and multiplicative mask 11 in terms of minimal polynomial 103;

FIG. 27 an affinely randomized table with input mask 00 and output mask 02 and multiplicative mask 11 in terms of minimal polynomial 103;

FIG. 28 an affinely randomized table with input mask 31 and output mask 02 and multiplicative mask 11 in terms of minimal polynomial 103;

FIG. 29 a table simply extended starting out from the table from FIG. 28, with a single complementary table;

FIG. 30 a table doubly extended starting out from the table from FIG. 28, with three complementary tables;

DETAILED DESCRIPTION OF VARIOUS EMBODIMENTS

Figures 16, 17:
FIG. 16 a table additively randomized and simply extended according to the invention, starting out from the table from FIG. 15.
FIG. 17 a table additively randomized and doubly extended according to the invention, starting out from the table from FIG. 15.

FIG. 1 shows correlation curves for a second-order DPA attack on a table access in AES a) in XOR masking and b) in extended masking according to embodiments of the invention. As a table an AES S-box is provided. The correlation curve from FIG. 1a was established with a second-order DPA attack on a table access in AES upon execution of the table access with the right key. The table is XOR-masked. The significant peak indicates that the right key k was employed. If the table access was executed with a wrong key k, the peak is absent, similarly to FIG. 1b. FIG. 1b shows a correlation curve that was obtained from a second-order DPA attack on the same table access in the course of AES as the curve from FIG. 1a. In contrast to FIG. 1a, the table is masked in FIG. 1b with the secondary masking according to the invention in addition to the base XOR masking. The secondary masking is realized by the XOR-masked table on which FIG. 1a is based being extended to a simply extended table which comprises the XOR-masked table and the complementary table to the XOR-masked table. The table access is executed on the extended table. In so doing, either the XOR-masked table or the complementary table is randomly accessed within the extended table. Upon execution of the table access to the extended table with the right key, the prominent peak indicating the presence of the right key is absent in the correlation from FIG. 1b in comparison to the correlation of the only base-masked table according to FIG. 1a. Thus, with the simply extended table instead of a merely XOR-masked table, table accesses with the right key are indistinguishable from table accesses with wrong keys.

Table accesses to a doubly extended table which comprises the base-masked table and three complementary tables deliver similar correlation curves to that shown in FIG. 1b. With a doubly extended table, table accesses with the right key k are thus also indistinguishable from table accesses with a wrong key. In the three complementary tables only the table input is complemented, only the table output is complemented, or the table input and the table output are complemented, starting out from the base-masked table.

Second-order DPA attacks on merely affinely masked table accesses in AES deliver similar correlation curves to that shown in FIG. 1a, with a prominent peak, if the right key k was employed, and a uniform curve similar to that shown in FIG. 1b for wrong keys k. Correlation curves on extended-masked tables which are based on an affine masking as base masking are indistinguishable, however, regardless of whether the right or a wrong key was employed.

FIG. 2 shows a sub-computation from an AES encryption wherein a table access to a table S (S-box, AES substitution table) is executed. The table access from FIG. 2 is suited for being masked with the method according to the invention. FIG. 2 represents two tables S in AES which are applied at different places in the algorithm AES, here more precisely in different rounds of AES. The two tables S are represented in FIG. 2 with the same symbols p, k, x, y for plaintext p, key k, input value x of the table S and output value y of the table S, in order to indicate that the computing process on the basis of the table S is the same for both tables S. The values of plaintext p, key k, input value x and output value y are normally different for each table S.

FIG. 3 shows computation rules for base-masking an intermediate value to a masked intermediate value with XOR masking, additive masking and affine masking. The computation rule for masking x with an XOR base masking to $x_{XOR}$ reads $x \rightarrow x_{XOR}$ $X \oplus r$. The computation rule for masking x with an additive base masking to $x_{add}$ reads $x \rightarrow x_{add} = x+r \mod 2^n$. The computation rule for masking x with an affine base masking to $x_\alpha$ reads $x \rightarrow x_\alpha = \alpha x \oplus r$.

FIG. 4 shows a table S in unmasked form (original table), e.g. an AES S-box. The table is represented in the quaternary system with base 4. Consequently, each bit can assume the four values 0, 1, 2, 3. In a table access in AES according to FIG. 2, with a table according to FIG. 4, the table input x=xx is formed by the concatenation of column index and row index. The value located at the place in the table specified by column index and row index is the table output y=yy. In FIG. 4 there is drawn in an example of a table access with table input xx=12 and table output yy=11 (intersection region of the two ellipses).

FIG. 5 shows a complemented table $\bar{S}$ the table S from FIG. 4, wherein only the table input x is complemented. The table input x is complemented by the positions of the table entries being complemented. For example, the entry for the index x=xx=00 from FIG. 4 is shifted in FIG. 5 to the index $\bar{x}$=33, the entry for the index x=12 to the index $\bar{x}$=21, etc. With the masking from FIG. 5 the example from FIG. 4 becomes a table access with table input xx=21 and table output yy=11 (intersection region of the two ellipses).

FIG. 6 shows a complemented table $\bar{S}$ to the table S from FIG. 4, wherein only the table output y=yy is complemented to $\bar{y}$. The table output y is complemented by the value of the table entry being complemented. For example, the table output value y=11 at the index x=12 from FIG. 4 is complemented in FIG. 6 to a table output value $\bar{y}$=22, while remaining at the same place. With the masking from FIG. 6 the exemplary table access yields table input x=12 and table output $\bar{y}$=22 (circle).

FIG. 7 shows a complemented table $\bar{S}$ to the table S from FIG. 4, wherein the table input x and the table output y are complemented. Starting out from FIG. 5, the table entry leading from the input value x=21 to the output value y=11 in FIG. 5 is e.g. complemented to an output value $\bar{y}$=22. Starting out from FIG. 6, the output value $\bar{y}$=22 of FIG. 6 is shifted from the index x=12 to the index $\bar{x}$=21, i.e. the input value x is additionally complemented to $\bar{x}$. In the masking of FIG. 7 the table access from FIG. 4 thus becomes the table access with table input $\bar{x}$=21 and table output $\bar{y}$=22 (circle).

FIGS. 8-12 show tables S', S" randomized (=masked) starting out from the table from FIG. 4, with an XOR masking as a base masking. Each input value x of the tables in FIGS. 8-12 is thus masked to $x_{XOR}$ according to the computation rule $x \rightarrow x_{XOR} = x \oplus r$.

FIG. 8 shows an XOR-randomized table S', with input mask 31 and output mask 00, i.e. only the table input x is masked, viz. with XOR mask 31, and the table output y is unmasked (XOR mask 00, which is equivalent to no masking). Starting out from the table S from FIG. 4, this yields input 23 and output 11 (circle).

FIG. 9 shows an XOR-randomized table S', with input mask 00 and output mask 02, i.e. only the table output is masked, viz. with XOR mask 02, and the table input is unmasked (XOR mask 00). Starting out from the table from FIG. 4, this yields input 12 and output 13.

FIG. 10 shows an XOR-randomized table S', with input mask 31 and output mask 02. FIG. 10 shows a table masked with XOR masking as a base masking, said table serving as a basis for generating simply and doubly (twice) extended-masked tables (FIGS. 11, 12). Starting out from the table from FIG. 4, this yields a table access with input value $x_{XOR}$=23 and output value $y_{XOR}$=13.

FIG. 11 shows a table S" XOR-randomized (=XOR-masked) and simply extended according to the invention (simply: extension only in one direction of the table, here to the right), with input mask 31 and output mask 02. The extended table contains the uncomplemented XOR-base-masked table S' (=table from FIG. 10) and a complementary table $\bar{S}'$ to the XOR-base-masked table. The complementary table $\bar{S}'$ is formed by the table input x and the table output y being complemented in the base-masked table S' from FIG. 10. The second bit (column index) of the table input x is extended by a prefixed selection bit a (=table selection portion). Table inputs x thus have the form xax in the table from FIG. 11, table outputs y unchanged the form yy. The form xax is stated by way of example and might alternatively likewise be axx or xxa. The entries for the column indices 00, 01, 02, 03 (on the left) in which the selection bit a in the table input value xax has the value zero (0) belong to the uncomplemented table masked only with the base masking (table from FIG. 10). The entries for the column indices 10, 11, 12, 13 (on the right, curly bracket, 1x) in which the selection bit a in the table input value xax has the value one (1) belong to the complementary table. In the extended masking S" from FIG. 11 the exemplary table access from FIG. 4 becomes a table access with table input xax=203 and table output yy=13 or table input xax=213 and table output yy=31. It is random whether the table access is executed with either table input $x_{XOR}$=xax=203 and table output yy=13 (left half of table, selection bit in the table input 203 having the value 0) or table input $x_{XOR}$=xax=213 and table output yy=31 (right half of table, selection bit in the table input 213 having the value 1).

FIG. 12 shows a table S" XOR-randomized and doubly extended according to the invention, starting out from the table S from FIG. 4, with input mask 31 and output mask 02, with three complementary tables S'. In other words, FIG. 12 shows a table doubly extended by three complementary tables S' (extended to the right and extended downward) starting out from the base-masked table S' from FIG. 10. In the doubly extended table S" from FIG. 12, both bits of the table input x (row index and column index) are respectively extended by a prefixed bit. Table inputs x thus have the form axax in the table from FIG. 12, table outputs y unchanged the form yy. The form axax is stated by way of example and might alternatively likewise be different, e.g. aaxx, or xxaa, or axxa or xaax. Table entries in the upper left quadrant of the doubly extended table from FIG. 12, with indexes (input values) 0x, designate the table merely masked with the base masking (table from FIG. 10). Table entries with column index 1x (upper right quadrant) designate a table in which the table input x is masked (horizontal bracket above) starting out from the base-masked table (FIG. 10). Table entries with row index 1x (lower left quadrant) designate a table in which the table output y is masked (vertical bracket on the left) starting out from the base-masked table (FIG. 10). Thus there is disposed in the upper right quadrant of the doubly extended table from FIG. 12 a first complementary table in which merely the table input x is complemented compared with the table from FIG. 10. In the lower left quadrant of the doubly extended table from FIG. 12 there is disposed a second complementary table in which merely the table output y is complemented compared with the table from FIG. 10. In the lower right quadrant of the doubly extended table from FIG. 12 there is disposed a third complementary table in which both the table input x and and the table output y are complemented compared with the table from FIG. 10. The exemplary table access from FIG. 4 leads, depending on the values of the selection bits aa, to a random one of the table accesses encircled in FIG. 12, i.e.: $x_{XOR}$=axax=0203, yy=13; or $\overline{x_{XOR}}^1$=axax=0213, =02; or $\overline{x_{XOR}}^2$=axax=1203, yy=20; or $\overline{x_{XOR}}^3$=axax=1213, yy=31.

The use, according to the invention, of a simply and a doubly extended table will be explained hereinafter with reference to FIGS. 2, 11 and 12. In an AES crypto-coprocessor an AES computation (electively encryption, decryption, signature generation or signature check) is started, in FIG. 2 an encryption by way of example. AES comprises a plurality of rounds R=1, 2, . . . . In each round R a sub-computation is executed in which a plaintext byte p is XORed (p⊕k) with a key byte k, the result of the XORing is inserted into a (substitution) table S (S-box), and an intermediate value x=S[p⊕k] thereby computed through a table access to the table S.

According to an embodiment of the invention, there is employed as a table S in FIG. 2 a table S" simply extended according to FIG. 11. The input value x is extended by one bit as a table selection portion a. The input value x is thus $x=x_1ax_0$, in FIG. 11 x=203 for example, if the non-complemented table S' is accessed, with output value y=13 (as in FIG. 10), and x=213, if the complemented table $\overline{S}$' in S" is accessed, with output value y=31.

According to another embodiment of the invention, there is employed as a table S in FIG. 2 a table S" doubly extended according to FIG. 12. The input value x is extended by two bits. The input value x is thus $x=a_1x_1a_0x_0$, in FIG. 11 x=0203 for example, if the non-complemented table S' is accessed, with output value y=13 (as in FIG. 10), and x=1203, if the complemented table $\overline{S}$' with only output complemented is accessed, with output value y=20, etc.

FIGS. 13-17 show randomized (=masked) tables which are masked by additive masking starting out from the original table from FIG. 4. FIGS. 13-17 are analogous to FIGS. 8-12, only with different base masking.

FIG. 13 shows a table S' additively randomized starting out from the table from FIG. 4, with input mask 31 and output mask 00. The input masking converts the input value x=12 from FIG. 4 to the masked input value x=03. The output value y=11 remains unchanged (masking of the output with 00).

FIG. 14 shows a table S' additively randomized starting out from the table S from FIG. 4, with input mask 00 and output mask 02. FIG. 15 shows a table S' additively randomized starting out from the table S from FIG. 4, with input mask 31 and output mask 02. FIG. 16 shows a table S" additively randomized and simply extended according to the invention, starting out from the table S from FIG. 4, with input mask 31 and output mask 02, with the base-masked table S' and one complementary table $\overline{S}$'. FIG. 17 shows a table S" additively randomized and doubly extended according to the invention, starting out from the table S from FIG. 4, with input mask 31 and output mask 02, with the base-masked table S' and three complementary tables $\overline{S}$'.

FIGS. 18-22 show tables S' mixed-randomized (=masked) starting out from the original table S from FIG. 4, with additive input mask and XOR output mask. FIGS. 18-22 are analogous to FIGS. 8-12 and FIGS. 13-17, only with different base masking.

FIG. 18 shows a table S' mixed-randomized starting out from the table from FIG. 4, with additive input mask 31 and XOR output mask 00. FIG. 19 shows a table S' mixed-randomized starting out from the table from FIG. 4, with additive input mask 00 and XOR output mask 02. FIG. 20 shows a table S' mixed-randomized starting out from the table from FIG. 4, with additive input mask 31 and XOR output mask 02. FIG. 21 shows a table S" mixed-randomized and simply extended according to the invention, starting out from the table from FIG. 4, with additive input mask 31 and XOR output mask 02, with the base-masked table S' and one complementary table $\overline{S}$'. FIG. 22 shows a table S" mixed-randomized and doubly extended according to the invention, starting out from the table from FIG. 4, with additive input mask 31 and XOR output mask 02, with the base-masked table S' and three complementary tables $\overline{S}$'.

FIGS. 23-30 illustrate stepwise the generation of a simply extended (FIG. 29) and a doubly extended (FIG. 30) table S", upon an affine base masking with input mask 31 and output mask 02 and multiplicative mask 11 in terms of minimal polynomial 103 (FIG. 28).

FIG. 23 shows a multiplication table for 11 in terms of minimal polynomial 103. FIG. 24 shows an inverted multiplication table for 11 in terms of minimal polynomial 103. FIG. 25 shows an affinely randomized (masked) table S' with input mask 00 and output mask 00 and multiplicative mask 11 in terms of minimal polynomial 103. FIG. 26 shows an affinely randomized table S' with input mask 31 and output mask 00 and multiplicative mask 11 in terms of minimal polynomial 103. FIG. 27 shows an affinely randomized table S' with input mask 00 and output mask 02 and multiplicative mask 11 in terms of minimal polynomial 103. FIG. 28 shows an affinely randomized table S' with input mask 31 and output mask 02 and multiplicative mask 11 in terms of minimal polynomial 103.

FIG. 29 shows a table S" simply extended starting out from the table S' from FIG. 28, i.e. altogether a simply extended affinely randomized table S" with input mask 31 and output mask 02 and multiplicative mask 11 in terms of minimal polynomial 103.

FIG. 30 shows a table S" doubly extended starting out from the table S' from FIG. 28, i.e. altogether a doubly extended affinely randomized table S" with input mask 31 and output mask 02 and multiplicative mask 11 in terms of minimal polynomial 103.

CITED PRIOR ART

1) DE 198 22 217 A1;
2) WO 01/31422 A2;
3) EP 2 302 552 A1;

4) [SP06] K. Schramm, C. Paar: *Higher Order Masking of the AES.* In: Pointcheval, D. (ed.), CT-RSA 2006, Springer, Lecture Notes in Computer Science LNCS 3860, 2006, pp. 208-225;
5) [RDP08] Matthieu Rivain, Emmanuelle Dottax, Emmanuel Prouff: *Block Ciphers Implementations Provably Secure Against Second Order Side Channel Analysis,* In: Kaisa Nyberg (ed.), Fast Software Encryption—FSE 2008, Springer, Lecture Notes in Computer Science LNCS 5086, 2008, pp. 127-143;
6) [PRB10] E. Prouff, M. Rivain, R. Bevan: *Statistical Analysis of Second Order Differential Power Analysis,* http://eprint.iacr.org/2010/646.pdf, IEEE Transactions on Computers 58, pp. 799-811, 2009;
7) [GPQ11] L. Genelle, E. Prouff, M. Quisquater: *Thwarting High-Order Side Channel Analysis with Additive and Multiplicative Maskings,* http://eprint.iacr.org/2011/425.pdf, Cryptographic Hardware and Embedded Systems—CHES 2011, Lecture Notes in Computer Science 6917, pp. 240-255, Springer, 2011;
8) [KHL11] H. Kim, S. Hong, J. Lim: *A Fast and Provable Secure Higher Order Masking of AES S-Box,* Cryptographic Hardware and Embedded Systems—CHES 2011, Lecture Notes in Computer Science 6917, pp. 95-107, Springer, 2011.

The invention claimed is:

1. A method, in a processor, for executing a cryptographic computation (AES) wherein output data (C) are generated from input data (P) employing a cryptographic key (K) and via the generation of intermediate values (x, y),
wherein upon the execution of the computation (AES) a base masking (XOR; $\alpha$) is applied through which at least some, preferably all, intermediate values (x, y, . . . ) are incorporated into the computation as masked intermediate values ($x_{XOR}$, $y_{XOR}$, . . . ; $x_\alpha$, $y_\alpha$, . . . ),
wherein upon the execution of the computation (AES) a secondary masking (00/FF) is additionally applied, wherein for each intermediate value ($x_{XOR}$; $x_\alpha$) masked by means of the base masking (XOR; $\alpha$) the one's complement ($\overline{x}_{XOR}$; $\overline{x}_\alpha$) of the masked intermediate value ($x_{XOR}$; $x_\alpha$) is formed, the masked intermediate value ($x_{XOR}$; $x_\alpha$) and the one's complement ($\overline{x}_{XOR}$; $\overline{x}_\alpha$) of the masked intermediate value ($x_{XOR}$; $x_\alpha$) are made available, and randomly the computation (AES) is executed either with the masked intermediate value ($x_{XOR}$; $x_\alpha$) or with the one's complement ($\overline{x}_{XOR}$; $\overline{x}_\alpha$) of the masked intermediate value ($x_{XOR}$; $x_\alpha$),
wherein the computation (AES) comprises a sub-computation through which an intermediate value (y=S[x]) is generatable from an input value (x=p⊕k) while executing a table access to a table (S) having a plurality of table entries (y), wherein for executing the computation or at least the sub-computation
the table (S) is masked with the base masking (XOR; $\alpha$) to a masked table (S'), and the masked table (S') is masked with the secondary masking (00/FF), wherein the masked table (S') is complemented, so that at least one masked complementary table ($\overline{S}'$) is computed,
the masked table (S') and the at least one masked complementary table ($\overline{S}'$) are made available, and
the sub-computation is executed by executing the table access randomly on either the masked table (S') or the, or a, masked complementary table ($\overline{S}'$).

2. The method according to claim 1, wherein there is provided as a base masking a simple or multiple XOR masking, or an affine masking ($\alpha$), or a decomposition masking, or a chaining of two or more of the above-mentioned base maskings.

3. The method according to claim 1, wherein the randomized accessing of either the masked table (S') or the, or a, masked complementary table ($\overline{S}'$) is executed by extending the input value (x), for generating the intermediate value (y=S[x]), by a table selection portion (a; $a_1$ . . . $a_0$) through which the table that is accessed is specified.

4. The method according to claim 1, wherein the table (S) has a table input (x) and has a table output (y), and wherein exactly one masked complementary table ($\overline{S}'$) is computed in which both the table input (x) and the table output (y) are complemented by the positions of the table entries in the table (S) being complemented and the values of the table entries in the table (S) being complemented.

5. The method according to claim 1, wherein the table (S) has a table input (x) and has a table output (y), and wherein three masked complementary tables ($\overline{S}'$) are computed, wherein
in a first masked complementary table ($\overline{S}'$) only the table input (x) is complemented by the positions of the table entries in the masked table (S') being complemented,
in a second masked complementary table ($\overline{S}'$) only the table output (y) is complemented by the values of the table entries in the masked table (S') being complemented, and
in a third masked complementary table ($\overline{S}'$) both the table input (x) and the table output (y) are complemented by the positions of the table entries in the masked table (S') being complemented and the values of the table entries in the table (S) being complemented.

6. The method according to claim 1, wherein the masked table (S') and the at least one complementary table ($\overline{S}'$) are entered into a single extended table (S") which contains the table entries of the masked table (S') and the at least one complementary table ($\overline{S}'$) in a predetermined arrangement (one after the other; alternating like a checkerboard; . . . ).

7. The method according to claim 1, wherein the processor has associated therewith a permanent memory (ROM) and a volatile working memory (RAM), and wherein the table (S) is stored in the permanent memory (ROM), and the masked table (S') and the at least one masked complementary table ($\overline{S}'$) are computed in the volatile working memory (RAM).

8. The method according to claim 1, wherein
the masked table (S') and at least one complementary table ($\overline{S}'$) are employed for a plurality of table accesses to the table (S), electively for at least one total execution of the cryptographic computation (AES), and
within the plurality of table accesses it is newly randomly specified at least once, preferably for each table access, that the computation (AES) is executed either with the masked intermediate value ($x_{XOR}$; $x_\alpha$) or with the one's complement ($\overline{x}_{XOR}$; $\overline{x}_\alpha$) of the masked intermediate value ($x_{XOR}$; $x_\alpha$), and the computation is executed in accordance with said specifying.

9. The method according to claim 1, wherein the table (S) has a table input (x) and has a table output (y), and wherein the masked table (S')
has a masked table input (x),
or has a masked table output (y),
or has a masked table input (x) and a masked table output (y), wherein the table input (x) and the table output (y) further either are masked with the same base masking (XOR; $\alpha$) or are masked with different base maskings (XOR; $\alpha$).

* * * * *